United States Patent [19]

Galliano

[11] Patent Number: 4,729,210
[45] Date of Patent: Mar. 8, 1988

[54] PROCESS AND APPARATUS FOR PACKAGING ARTICLES IN STRETCHABLE PLASTIC FILM

[75] Inventor: Mariano Galliano, Comano, Switzerland

[73] Assignee: Padeco S.A., Roveredo, Switzerland

[21] Appl. No.: 907,083

[22] Filed: Sep. 12, 1986

Related U.S. Application Data

[63] Continuation-in-part of Ser. No. 695,046, Jan. 25, 1985, abandoned.

[30] Foreign Application Priority Data

Feb. 2, 1984 [IT] Italy ............... 19411 A/84

[51] Int. Cl.$^4$ ............................................. B65B 53/00
[52] U.S. Cl. ................................... 53/441; 53/451; 53/551; 53/556
[58] Field of Search .................. 53/58, 441, 450, 451, 53/452, 453, 504, 550, 551, 552, 554, 556, 567, 564, 563, 575, 574

[56] References Cited

U.S. PATENT DOCUMENTS

| | | | |
|---|---|---|---|
| 2,915,866 | 12/1959 | Bartlo | 53/552 X |
| 2,959,901 | 11/1960 | Conti | 53/550 X |
| 3,055,154 | 9/1962 | Markley et al. | 53/551 |
| 3,070,931 | 1/1963 | Zwight | 53/552 |
| 3,703,796 | 11/1972 | Inoue et al. | 53/551 X |
| 3,872,644 | 3/1975 | Giraudi et al. | 53/504 X |
| 4,501,106 | 2/1985 | Treiber et al. | 53/504 X |
| 4,516,385 | 5/1985 | Lenker et al. | 53/504 |

FOREIGN PATENT DOCUMENTS 827792 2/1960 United Kingdom ............... 53/551

Primary Examiner—Robert L. Spruill
Assistant Examiner—Steven P. Weihrouch
Attorney, Agent, or Firm—Browdy and Neimark

[57] ABSTRACT

Process for packaging items having irregular shape and size, singly on in groups, in a stretchable film of plastic material, comprising the operations of forming, filling and sealing a bag from the stretchable plastic film such film being maintained under adjustable tension and stretch and subsequently adherent on the items due to the elastic "memory" of the released film. The machine for operating the process continuously comprises essentially two members subjected to a reciprocating motion, provided with means for gripping, stretching, sealing and cutting the plastic film, each of such members being subjected to a motion having a stroke of varying length and independent from the one to the other member.

14 Claims, 7 Drawing Figures

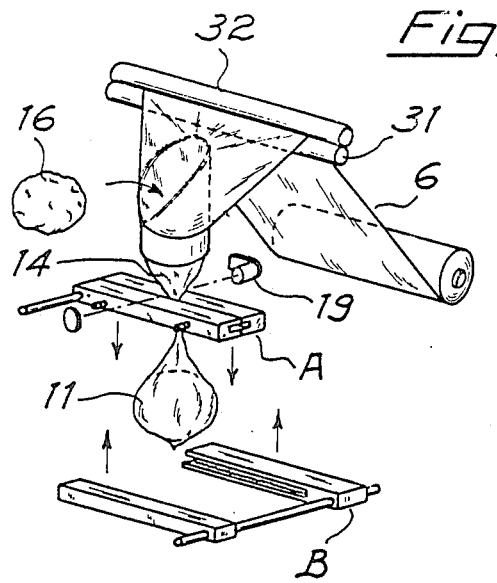
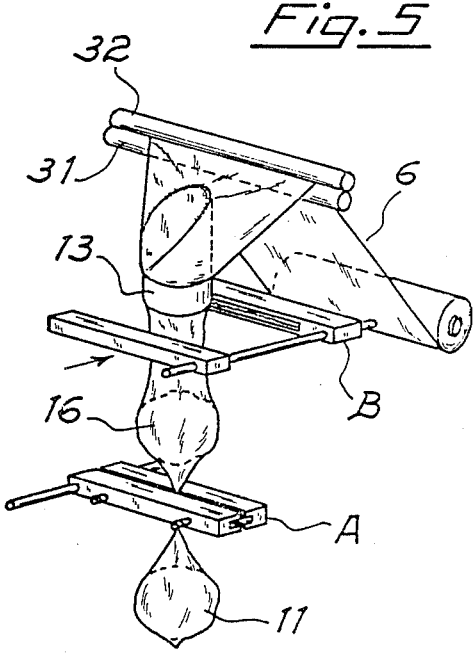
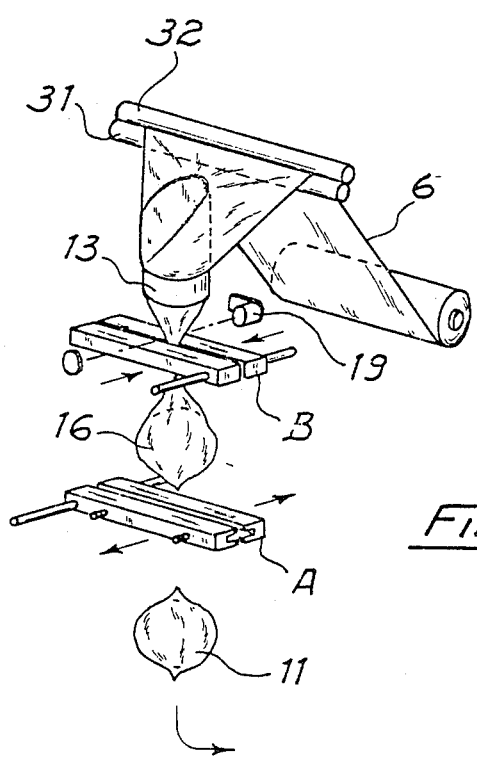

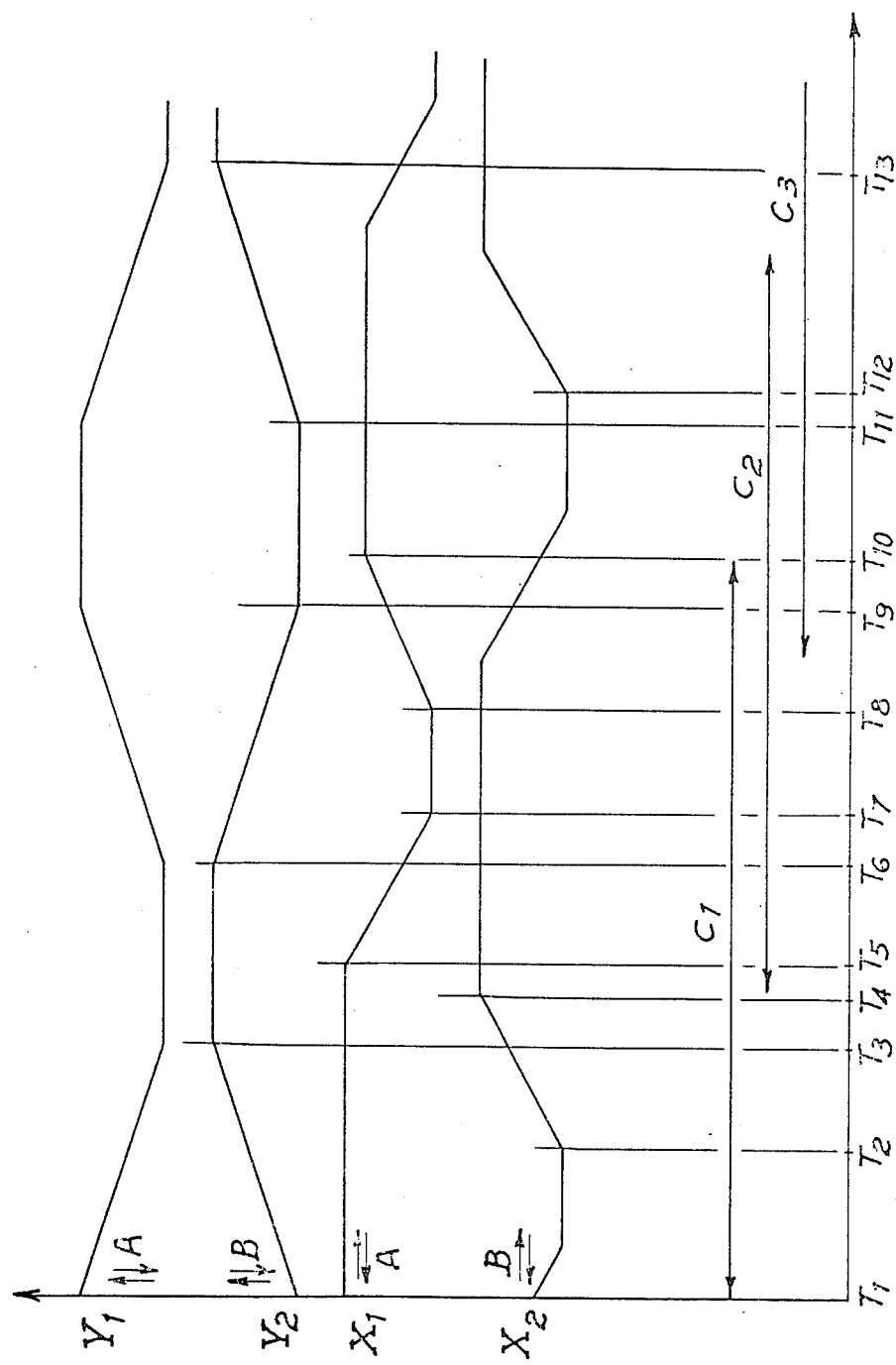

PROCESS AND APPARATUS FOR PACKAGING ARTICLES IN STRETCHABLE PLASTIC FILM

This is a continuation in part of application Ser. No. 695,046 filed 01/25/85, now abandoned.

FIELD OF THE INVENTION

The present invention concerns a process and apparatus for packaging articles in a stretchable plastic envelope. The articles to be packaged may have irregular sizes and shapes, such as agricultural products. The stretchable film perfectly adheres to the surface of the packaged article. Both the process and apparatus are suitable for continuous working, i.e., without idle times between the end of packaging one article and beginning to package the next one.

BACKGROUND OF THE INVENTION

It is well known that many items are preferentially packaged in plastic films, particularly transparent plastic films. However, when the items to be packaged are of variable size and shape, such as, for example, vegetables and fruits, the presently known mechanical packaging operations may present considerable difficulties.

Plastic films have been generally known before the Second World War, but immediately after the war, the use of plastic films for packaging increased rapidly. A variety of polymers were used in order to provide packaging films having improved properties.

Prior to 1958, the films most generally in use for packaging were polyvinylchloride, polyethylene, polypropylene, and polyvinylidene (Saran), alone or mixed with different elastomers. Plastic films made from these polymers cannot be considered to be stretchable films because these films have a low extensibility. Films made from these polymers have a longitudinal or transversal extensibility which is less than 50% at normal temperatures (from about 5 to about 35° C.).

Thus stretchable films, under the same temperature conditions as above, have an extensibility of at least 50%, and in some cases up to about 300%. Another striking difference between non-stretchable and stretchable plastic films is the elastic memory of the films. Normal films, even when stretched for about 35 to 45%, do not return to the original dimensions, but remain over-extended and weakened. Stretchable films, on the other hand, return almost to the original dimensions after being stretched, and do not lose the mechanical properties they had before being stretched.

The machines presently available for packaging articles in plastic films may be categorized in two groups: those using an unstretchable tubular plastic film, and those using a stretchable flat plastic film. In the first case, the machine inserts the item to be packaged into the tubular film, then the film bottoms sealed to form a bag, which is then sealed by welding or fastening. In such packages, however, the film adheres only onto very few parts of the surface of the item, and, consequently, there are formed recesses and irregularities which may cause the package to split apart during subsequent handling of the packaged item. The mechanisms wherein the flat plastic film is of the stretchable type first stretch the film and then wrap the item around the item, lapping the film edges in the area where the film is to be sealed. In this case the packages are also irregular in shape, and excess plastic material is often left on the package. Because of these and further difficulties, in many installations packaging using a stretchable film is performed manually, in order to benefit from the advantages shown thereby.

SUMMARY OF THE INVENTION

It is an object of the present invention to provide a process which renders it possible to package mechanically items which have any shape and size, in a plastic film of the stretch type, the film being made elastically adherent on the outer surface of the items.

It is another object of the present invention to provide a process for packaging in a stretch film items having various shapes and sizes without interruption of the process, or in such a manner that no idle times occur between the end of packaging one article and beginning the packaging of the following article.

It is a further object of the present invention to provide a machine suitable for performing the above-described process, which machine is of a very simple structure, light, and capable of being carried anywhere, even into fields where produce is harvested. The simplification of the machine is achieved by reducing the number of moving parts essentially to two, and assigning them in turn to perform the main operations of the process, i.e., forming a bag with the stretchable film, introducing the item to be packaged into the bag so formed, sealing the bag, and removing the bag while maintaining the stretchable film under tension.

The process of the present invention is designed to be carried out using stretchable film, i.e., film which has an extensibility of at least 40%. Use of this film provides a package which is strong, easily applied, and conforms to the shape of the article packaged. The machine of the present invention is designed to package articles using a stretchable film, i.e., a film which has an extensibility of at least 40%.

BRIEF DESCRIPTION OF THE DRAWINGS

The characteristics of the invention will be made clear from the following description of a preferred, not limiting, embodiment thereof, which is illustrated by the accompanying drawings.

FIGS. 4 to 7 show schematically the process according to the invention carried on by the machine shown the other drawings.

DESCRIPTION OF THE PREFERRED EMBODIMENT

Figure 1:
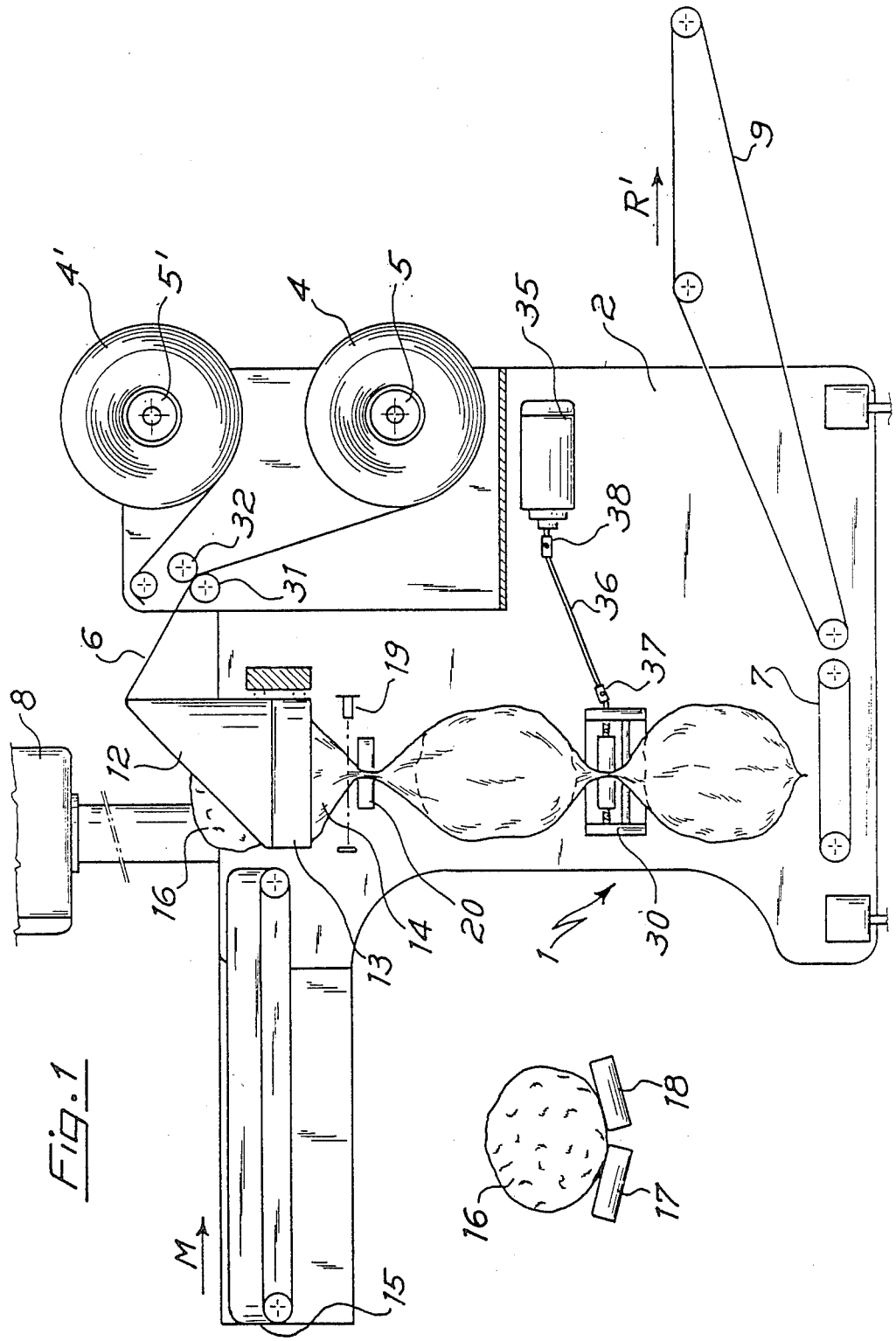
FIGS. 1 and 2 show schemtically a side view and a front view respectively of the packaging machine according to the present invention.
Figure 2:
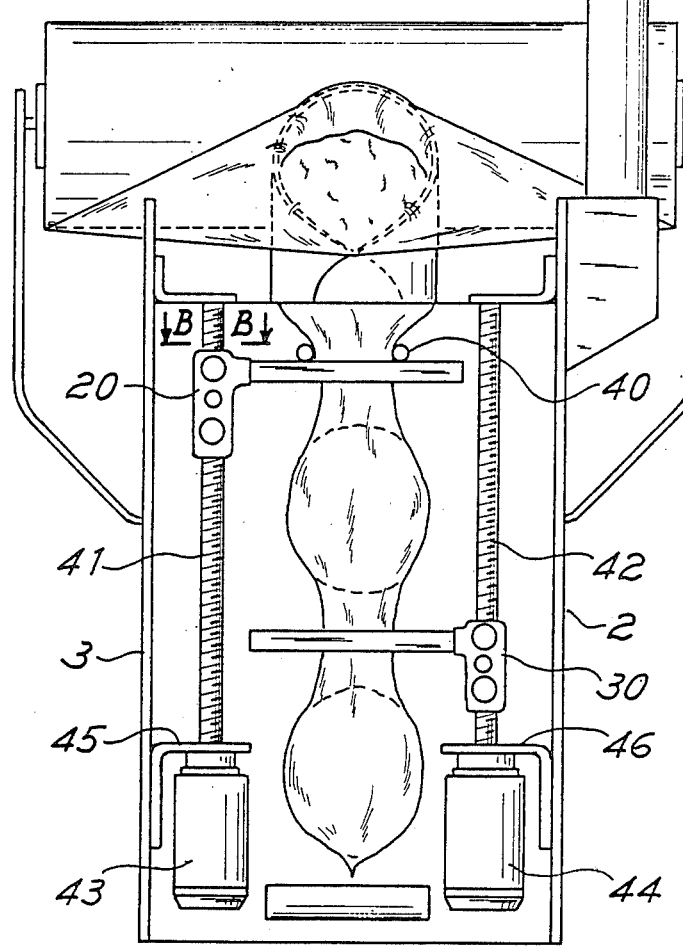

With reference to FIGS. 1 and 2, the packaging machine 1 according to the invention is essentially formed by a main frame consisting of two parallel plates 2 and 3 which support a film feeding system, an electric control system, a feeding system for the item to be packaged, and a discharging system for the packaged item.

The feeding system for the stretchable film web consists essentially of a roll 4 of film 6, the roll being mounted over a roller 5 suitable maintained stationary in a controlled manner to provide the tension necessary to stretch the film. In FIG. 1 is indicated the presence of a second roll 4' mounted over the roller 5'; this not necessary but preferable arrangement makes it possible at the end of one roll of film immediately to begin delivery of the film from the other roll without stopping the working of the machine. Such arrangement makes it also possible to change the kind of film used, e.g., film of a different thickness, color, and size, without losing too much time.

The electronic control system 8 may be scheduled as desired, and is provided with visualizers, keys, etc. to insert optionally desired modifications. One control means may be a microprocessor.

At pre-production of the machine, the stretchable film web 6, which is rolled off from one of the rolls 4 or 4', is moved through transmission rollers (not shown) and tension rollers 31 and 32, to the mouth of a forming member consisting of the parts 12 and 13, of a body having a cylindrical or prismatic cross section, the upper part of which, diagonally cut, is also called a deviation neck. The function of the forming member is to reel the film 6, as a tube, so that its margins in overlapped position can be sealed by appropriate sealing members (not shown for ease in description) to form the tubular film 14. Such sealing is accomplished while the film is maintained under tension in a way which will be described hereinafter.

The item 16 is inserted by hand or by the carrier 15 and preferably consists of two adjacent and slanting belts 17 and 18 as shown in FIG. 8. In the embodiment here described, concerning a machine fed from above (although it obviously can be fed laterally as well), the item 16 falls by gravity from a first moving member 20 inside the tubular film 14, which is sealed at its bottom to form a bag. Such moving member successively carries on the tightening, stretching, sealing, and severing of the tubular film 14 coming from the former 13. At all times during the operation, the film is maintained under tension.

The machine comprises a second moving member 30, substantially identical to 20 and having the same operation. Each of the moving members is operated by an independent electric engine such as, for example, the engine 35 of FIG. 1, through a push rod 36 and two articulated joints 37 and 38. This coupling is made necessary, since the position of the moving members 20 and 30 changes in the vertical direction (or horizontally for the model having side feeding) during each operating cycle of the machine.

A detecting device 19 (for example, a photoelectric cell) indicates to the moving members the beginning and end of the passage of the item to be packaged, and thus it allows sealing of the lower and upper ends of the tubular film 14 precisely in the size of the item to be packaged.

The machine also comprises rollers 40 which tighten the tubular film 14 perpendicularly to the traction caused by the moving members 20 and 30 so that the closure bag area is narrowed.

As is shown in FIG. 2, the moving members 20 and 30 can move vertically by means of rotating threaded rods 41 and 42 which are urged to rotate by the electric engines 43 and 44 secured to the machine base by means of hangers 45 and 46 respectively.

Figure 3:
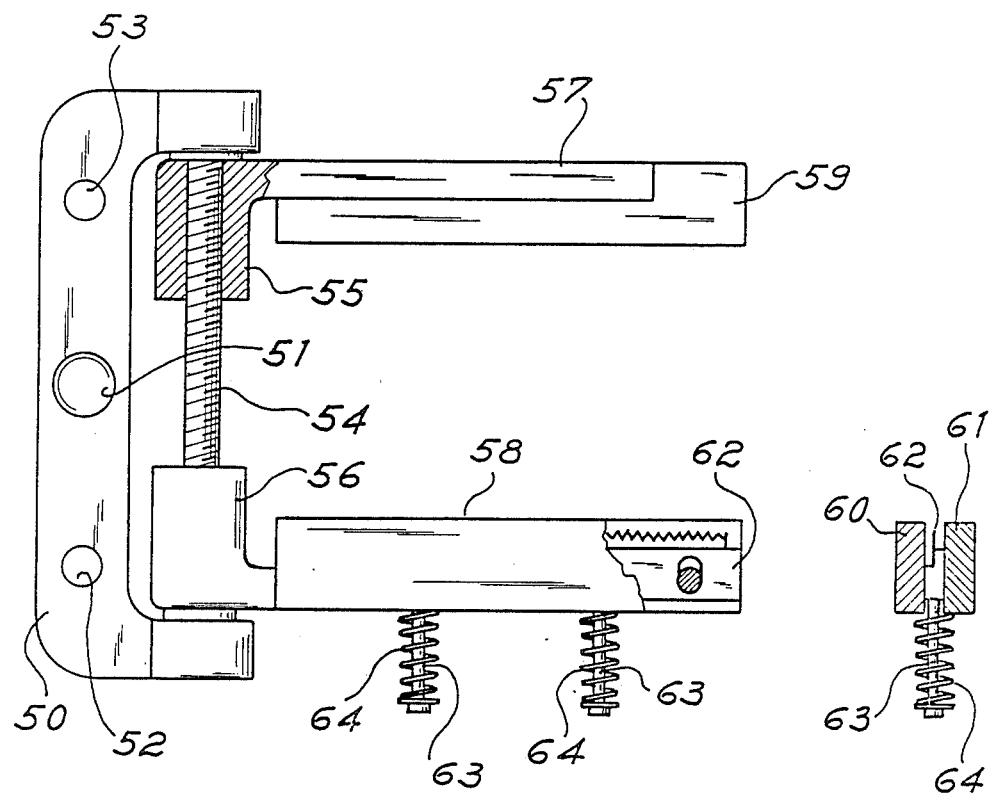
FIG. 3 is a cross-section along the line B—B of FIG. 2.

The structure of each of the two moving members 20 and 30 is illustrated in more detail in FIG. 3, where is shown a section along line B—B of FIG. 2. As can be seen in FIG. 3, each moving member 20 and 30 includes a C-shaped supporting hanger 50, supplied with a central threaded hole 51, through which the rotating rod 41 or 42 passes, such hole 51 being placed between the two guide holes 52 and 53. Between the parallel ends of the hanger 50 is mounted a threaded rod 54 engaging the inner threads of the cylindrical heads 55 and 56 of the horizontal arms 57 and 58, respectively, such arms forming a gripper for tightening, welding, and severing the tubular film 14.

Arm 57 has a portion 59 (facing arm 58) which is electrically heated, operating as a welding member for the tubular film. The arm 58 consists of two spaced parallel portions, which may be heated for welding purposes, which are combined with the compression springs 64. Between the portions 60 and 61 is located a blade 62 supported by two shafts 63 integral with the arm 58. This structure is clearly illustrated with reference to FIG. 9. The arms 57 and 58 may be moved apart or close to each other by the threaded rod 54 having one end engaged in a known manner (not shown) with the articulated joint 37 of the corresponding engine, which, according to the feeding received from the control system 8, determines the gripper closing (approaching of the arms 57 and 58) or the gripper opening (separation of the arms 57 and 58 to the position shown in FIG. 3).

When the two arms 57 and 58 are brought near each other by electric control, the tubular film is tight. If at the same time the inner portions 59, 60, and 61 are heated, the tubular film may also be welded. When the tubular film must be cut, the blade 62 moves out, protruding from the front edges of the portions 60 and 61 (which move back under the pressure of arm 57, causing the compression of the spring 64), and allows such coming forward of the blade a corresponding longitudinal recess in the inner part 59 of arm 57. When arm 57 moves away from arm 58, the compression on spring 64 ends, and consequently the portions 61 and 62 move forward and blade 62 does not stick out anymore.

As is shown in FIG. 2, the length of arms 57 and 58 of the moving member 20 is such that the arms do not interfere with the rotating threaded rod of the corresponding moving member 30. This makes it possible to move the two moving members 20 and 30 even in opposite directions by means of suitable electric controls given to the two engines 43 and 44 and, keeping one gripper closed while the other is wide open, the operating control exchange between them may be achieved.

This is illustrated in more detail in FIGS. 4, 5, 6, and 7. To avoid a long sequence of illustrations of the different structures represented by the moving members 20 and 30 during the machine operation, FIGS. 4, 5, and 6 show three particular and explanatory structures, while the diagrams in FIG. 7 schematically illustrate the complete machine operation. For ease, the gripper portions of the moving members 20 and 30 have ben indicated by the letters A and B, respectively.

FIG. 4 represents a disposition taken as starting disposition, and corresponding to time T1 of the diagram in FIG. 7. FIG. 5 represents the disposition of the different parts of the machine within T2 and T3 of the diagram in FIG. 7, while FIG. 6 corresponds to the time T5 of the same diagram.

With reference to FIG. 4, it can be seen that, at the moment taken as the machine preproduction, the gripper A, having the upper position, is tight on the tubular film 14 and has already carried on the lower welding of said tubular film, thus forming the bottom of the bag into which the item 16 will be introduced. As will be later more clearly described, the gripper A has already carried on also the cut of the underneath full bag 11 which is, however, still maintained hanging on the gripper A because of its tightened position.

Gripper B is in its lower position and completely open. The distance between grippers A and B thus corresponds at this moment to the largest possible distance according to the size of the items to be packaged. At the same time, a new item 16 is introduced into the tubular film 14 through the forming neck 12, and it prevents the light from the photocell to pass through during its descent, thus allowing the beginning of the packaging cycle of the new item 16.

The next movements of the grippers A and B are illustrated in FIG. 4 by the bold-faced arrows indicating schematically that while the gripper A, maintained in a tightened position, begins its descent, at the same time gripper B, still open, beings its ascent. During its movement down, gripper A maintains the tubular film under tension, which results in a slowing both by the resistance opposed by the forming member 13 and the resistance opposed by the roller 5 or 5', suitably held in a controlled manner.

When the item 16 has completely overpassed the cell 19, and it does not prevent further passage of light, the cell causes gripper A to stop. In this way, the tubular film 14 is cut precisely according to the size of item 16 without wasting the film, thus obtaining a final package in which the film perfectly adheres to the entire outer surface of the item.

FIG. 5, where, for the sake of simplicity, the photocell 19 has not been indicated, shows the moment at which the item 16 has passed beyond the photocell, causing gripper A to stop in its lower position, and gripper B to close. In the following moments, gripper B will tighten completely, effecting welding of the tubular film 14 and severing of the underhanging full bag. In FIG. 5, since the gripper A is still tight about the severed edges of the tubular film, the tubular film appears as if it has not been cut.

In FIG. 6, there is shown the movement at which the gripper A beings its opening and its movement upward. The gripper opening causes, by gravity, the package to fall onto the conveyor 7. At the same time, a new item is allowed to fall inside the bag formed from the tubular film 14, and the photocell causes the operating cycle to begin again, which comprises the complete opening of the gripper A, its upward movement beginning and the contemporaneous descent of gripper B, which remains tight and maintains tubular film 14 under tension.

As can be seen in FIGS. 4, 5, and 6, the tubular film 14 is permanently maintained under tension while the machine carries on the operations of forming a bag from the tubular film 14, packaging the item 16, and severing the package 11 from the tubular film 14.

The cyclic and continuous machine operation according to the present invention will appear clearly from the diagrams in FIG. 7 illustrating the cycles of the horizontal and vertical movements of the grippers A and B, in the sequence of the times T1 to T13, in performing the packaging cycles C1, C2, and C3 corresponding to three items fed in sequence to the machine. The diagram Y1 deals with the vertical movements of the gripper A during the time considered; diagram Y2 concerns the vertical movements of the gripper B during the considered time. X1 concerns the horizontal movements of the arms of the gripper A during the time considered, and X2 concerns the horizontal movements of the arms of the gripper B during the time considered.

At the moment T1, corresponding to the beginning of packaging cycle C1 referred to the first piece fed into the machine, gripper A is placed in the upper position of its vertical movement and is tight, while gripper B is open and placed in the lower position of its vertical strike. The tubular portion tightened by gripper A has been already cut (even if portions resulting still are joined because of tightening of the gripper), and the welding heat is in progress. Falling of the first piece breaks the light ray of photocell 19, determining a starting signal for the grippers, exactly at moment T1. Such signal causes the pre-operation of the electric engines and consequently the descent of gripper A (still tightened) and the contemporaneous rising of gripper B (which instead is open to conform the crossing with the coming down of gripper A). The stretch of tubular film 14 during the time T1 to T3 makes it possible that, when the tubular film is severed at T10, the film, because of the elastic memory of the stretchable film, shrinks and finally adheres tightly and uniformly about the item without irregularities, sacks, or the like. The tension is determined (n cycle C1) by the movement of gripper A which, in its downward movement, drags the tubular film against the resistance opposed by the forming neck and the tension rollers. During the downward phase of gripper A, it is reached by the upward movement to gripper B at the moment of T2. The stop of the gripper movement is operated, at T3, by the photocell 19, which detects the complete passage of the item fed. Indeed, when the item has completely passed beyond the light ray emitted by the lamp, the photocell becomes newly excited through the transparent film. The machine control unity provides then, according to a signal change coming from the photocell, a means to produce the stop signal to the grippers, optionally with suitable temporal delays. It should be noted that the follow-up link of the gripper vertical movement to the photocell allows packaging of the item with a tubular length exactly dimensioned according to the size of the item. Being already made the lower closure of the tubular film, its welding and cutting at the start of the cycle, the presence of a proper station in a fixed position to sever the already prepared package is not necessary. Thus, the machine unreels a length of tubular film exactly as is necessary for the particular item contained within the tubular film, without wasting any material, and increasing the rate of packaging for reduced size items.

During the range within the moments T3 and T5 (in which gripper A is kept tight and in the lower position), the tubular film is maintained under tension so that the plastic film is stretched and adheres to the item. At T4, the gripper B, in the upper position and tightened, operates the severing of the tightened tubular film and begins the welding phase. The cycle C2 thus begins by feeding a new item inside the newly formed bag, and, from time T6, it begins the upward movement of gripper Z which contemporaneously carries on its opening up to the maximum value reached at T7. Contemporaneously, from time T6, under the photocell control, gripper B begins the downward movement which stretches and keeps it up to time T9. Time T8 indicates the starting of the ascendent gripper tightening (gripper A), and it corresponds substantially to time T2 of cycle C1 previously considered for gripper B. The welding phase is delayed for a considerable part of the time period T4-T10 in accordance with the material used. Time T10 corresponds to the end of the packaging cycle C1 of the first item and to the beginning of the packaging cycle C3 of the third item fed into the bag kept tight by gripper A. In the meantime, cycle C2 for the second item occurs, which had started at time T4 and will end at an intermediate position during packaging cycle C3, and so on.

Times T11, T12, and T13 correspond functionally to times T1, T2, and T3, and have been considered only for clearly illustrating the process.

From the above described operation, two further favorable characteristics of the invention become evident. The first one is that the machine allows an automatic stop of the operation when no item is fed in. Indeed, during the short interval T4 to T5, all of the parts are at rest, waiting for a signal from the photocell for a new cycle to begin (T4). If in this position, the item feeding is interrupted, the machine does not get any signal from the photocell, and maintains such waiting position until a new item to be packaged descends. In this connection, it should be noted that the diagrams of FIG. 7 are substantially qualitative diagrams, where only the sequence T1, T2, T3, etc. remains constant, while the intervals between the movements may vary according to several external factors such as lack of an item to be packaged, size of the item, or the like) or internal factors, such as modifications of the time of the operating cycle as established by the user on the control console. The other important and consequent advantage is that the machine may be stopped at any moment without altering the operative structure. Indeed, if the operator interrupts feeding the machine in any position of the operative cycle, the machine will complete the packaging cycle in progression and take a position such as the one shown at FIG. 4, and afterwards, it will stop. The machine is thus ready for the next cycle with no material wasted nor a necessity for reproducing the starting conditions. These two advantages are particularly interesting when using the machine directly in the fields, or as a packaging unity adaptable at selling places, or in any and all situations where the packaging may be subjected to external factors.

From the above, it will be evident that this process develops continuously and has no idle times for putting the machine back into operation, since the only two movable members are identical and interchangeable. The packaging is of a high quality thanks to the constant tension applied during the gripper's downward movement, which is automatically adjusted to the size of the item to be packaged. Finally, due to the process and the electronic control, it is possible directly to vary almost all of the operating parameters to adjust the machine to different operating conditions, for example, by modifying the degree of tension on the film, packaging rate, welding length, etc.

Even if the invention has been described with a particular reference to a preferred embodiment thereof, it is not to be considered limited to this embodiment. The scope of the invention includes all of the obvious variations and/or modifications which have been suggested by the same solution and in any case which provide for the presence of identical gripping, stretching, welding, and severing members in the position to exchange the corresponding operation according to the assumed operative position.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. A process for packaging items of any shape in a stretchable plastic film, said plastic film having an extensibility of at least 40%, comprising:
   forming a bag from a web of plastic film; by sealing longitudinal edges of the film and transversely sealing a lower end of the film;
   inserting the item into the bag so formed;
   transversely sealing an upper end of the filled bag; and severing the bag from the plastic film;
   stretching the plastic film during the forming, inserting and sealing operations.

2. The process of claim 1 wherein the packaging steps are continuously carried out in a cyclical repetition, such that the operations in one cycle are performed simultaneously with the operations of the following cycle when packing a series of items.

3. Apparatus for packaging items of any shape in a stretchable plastic film comprising:
   means for forming a web of the film into a bag by sealing longitudinal edges of the film and transversely sealing a lower end of the film;
   means for stretching said film while said film is being formed into a bag;
   two moving members and means to reciprocate said members which members are provided with means for gripping, advancing, sealing and cutting the film and for stretching the film during said gripping, advancing and sealing.

4. Apparatus according to claim 3 having control means to coordinate the mutual movement of the moving members.

5. Apparatus according to claim 4 wherein the control means in a microprocessor.

6. Apparatus according to claim 3 wherein a detecting device indicates to the moving members the beginning and end of the item to be packaged.

7. Apparatus according to claim 6 wherein the detecting device is a photoelectric cell.

8. Apparatus according to claim 3 wherein the moving members are capable of being moved according to a reciprocating motion in opposite directions.

9. Apparatus according to claim 8 wherein each of the members is subjected to a motion having a stroke of varying length and independent from each other.

10. Apparatus according to claim 9 wherein a detecting device indicates to the moving members the beginning and end of the item to be packaged, and means are provided to stop motion of the members when the item has moved past the detecting device.

11. Apparatus according to claim 10 wherein the detecting device is a photocell.

12. Apparatus according to claim 3 including a roller held during the motion of the members to maintain the film under tension.

13. Apparatus according to claim 3 wherein said members include rotating threaded rods passing through a center hole in each member.

14. The apparatus of claim 13 wherein electric engines are secured onto the apparatus at the base thereof which rotate said rotating threaded rods.

* * * * *